United States Patent
Volgstadt et al.

[19]

[11] Patent Number: 6,142,538
[45] Date of Patent: Nov. 7, 2000

[54] STAB-TYPE COUPLING WITH CONDUIT INNER DIAMETER SEAL

[75] Inventors: Frank R. Volgstadt, Madison; Steven J. Passerell, Rock Creek; James M. Lorenz, Madison, all of Ohio

[73] Assignee: Perfection Corporation, Madison, Ohio

[21] Appl. No.: 09/123,262

[22] Filed: Jul. 28, 1998

[51] Int. Cl.[7] ........................................ F16L 21/06
[52] U.S. Cl. ............................... 285/323; 285/342
[58] Field of Search ............................ 285/323, 331, 285/342, 351, 222.1, 239; 138/110

[56] References Cited

U.S. PATENT DOCUMENTS

| | | |
|---|---|---|
| 4,229,025 | 10/1980 | Volgstadt et al. . |
| 4,427,220 | 1/1984 | Decker .................................. 285/351 X |
| 4,445,714 | 5/1984 | Kisiel, III ............................ 285/323 X |
| 4,635,972 | 1/1987 | Lyall . |
| 4,705,304 | 11/1987 | Matsuda et al. . |
| 4,906,028 | 3/1990 | Yokomatsu et al. . |
| 4,906,030 | 3/1990 | Yokomatsu et al. . |
| 5,082,315 | 1/1992 | Sauer . |
| 5,090,741 | 2/1992 | Yokomatsu et al. ................. 285/323 X |
| 5,102,170 | 4/1992 | Inoue . |
| 5,112,087 | 5/1992 | Haruki . |
| 5,332,269 | 7/1994 | Homm . |
| 5,474,336 | 12/1995 | Hoff et al. ............................ 285/331 X |
| 5,669,637 | 9/1997 | Chitty et al. .............................. 285/342 |
| 5,692,785 | 12/1997 | Wartluft et al. . |

*Primary Examiner*—Lynne H. Browne
*Assistant Examiner*—Greg Binda
*Attorney, Agent, or Firm*—Fay, Sharpe, Fagan, Minnich & McKee, LLP

[57] ABSTRACT

A stab-type coupling (10) for connecting a conduit in fluid communication with a fluid receiving article or another conduit includes a coupling body (12) having an internal recess (16). A stiffener assembly (34) is positioned in the recess (16) and includes a tubular member (36) for insertion into a bore (CB) of a conduit (C) inserted into the recess (16). The stiffener assembly (34) also includes a radially enlarged retaining and spacing member (48) connected to the tubular member (36) and located in an axially inner region of the recess (16). The retaining and spacing member (48) includes a conduit end receiving channel (74) defined therein for receiving a conduit end (T) therein. The retaining and spacing member (48) also includes an integral gripping element (76) that engages an outer surface (S) of a conduit (C) seated in the groove (74) to prevent its withdrawal therefrom. A conduit inner diameter seal (40) is positioned concentrically around the tubular member (36) and prevents fluid passage between the tubular member (36) and a conduit inner surface defining the conduit bore (CB). A recess inner diameter seal (52) is positioned concentrically around the radially enlarged retaining and spacing member (48) to prevent fluid passage between the retaining and spacing member (48) and an inner surface (22) of the conduit body (12) defining the conduit receiving recess (16).

24 Claims, 4 Drawing Sheets

STAB-TYPE COUPLING WITH CONDUIT INNER DIAMETER SEAL

BACKGROUND OF THE INVENTION

This invention pertains to the art of conduit couplings, and more particularly to stab-type couplings for use with smooth-walled conduits.

Stab-type couplings permit quick and easy connection of pipes, tubes, and other conduits to a piece of equipment or to another conduit. The conduit to be coupled is cut at a right angle to its lengthwise axis to form a transverse end which is inserted or "stabbed" into a coupling body bore or recess. The coupling includes internal gripping elements that grip the outer surface of the inserted conduit and prevent its withdrawal from the coupling recess. Such a coupling is described in commonly assigned U.S. Pat. No. 4,229,025, the disclosure of which is expressly incorporated by reference herein.

Such couplings have been found to be particularly effective when used to couple lengths of plastic pipe such as that commonly employed in the transmission of natural gas. The coupling body is generally attached at one end to another member such as a male or female threaded member, a T-shaped or L-shaped member, or a like coupling to form a double-ended coupling.

The aforementioned U.S. Pat. No. 4,229,025 discloses a stab-type coupling that has been found to be highly effective and that has enjoyed widespread commercial success, particularly as a coupling for smooth-walled plastic natural gas conduit. Notwithstanding this success, there has been found a need for various improvements to this prior coupling for increased safety and durability with simplified manufacture and decreased cost.

More particularly, there has been found a need for a stab-type coupling for smooth-walled conduit that more effectively seals both the inner diameter of the coupling body recess and the inner diameter of the coupled conduit. With prior couplings, certain defects in the conduit itself may occasionally prevent effective sealing. For example, the conduit may include longitudinal scoring in its outer or inner surface. This scoring in the conduit acts as channels through which gas or other fluid is able to pass between the conduit outer surface and the coupling inner surface, or between the conduit inner surface and a "stiffener" member inserted into the open transverse end of the conduit. Also, it is generally desirable to provide a coupling with redundant sealing, especially when coupling natural gas conduits or the like. In such environments, leakage of the gas can lead to a dangerous situation.

As mentioned, prior couplings do not include redundant seal arrangements where the failure of one seal assembly does not result in fluid leakage. In the case of certain prior hydraulic couplings, for example, a single O-ring seal is provided to seal the inner surface of the coupling body. In the event the single seal fails, fluid leakage will certainly result. Similarly, prior hydraulic couplings that include a conduit inner diameter seal do not include any back-up seal mechanism in the event of seal failure.

Beyond effective sealing, it is critical that a coupling securely retain the conduit in position. In addition, it is desirable to reduce coupling cost and to simplify coupling use and construction. Simplification of construction not only reduces costs, but also reduces the chances for manufacturing defects and user errors.

Accordingly, it has been deemed desirable to develop a new and improved stab-type coupling for smooth-walled conduit that overcomes the foregoing deficiencies and others while providing better and more advantageous overall results.

SUMMARY OF THE INVENTION

According to the present invention, a new and improved stab-type coupling for conduit is provided.

In accordance with a first aspect of the invention, a stab-type coupling for connecting a smooth-walled conduit to a fitting or another conduit includes a coupling body having a first end and an internal recess for receiving an end portion of a smooth-walled conduit. A stiffener assembly is positioned in the recess and includes a tubular member for insertion into a bore of a conduit inserted into the recess. A radially enlarged member is connected to the tubular member and located in an axially inner region of the recess. The radially enlarged member abuts a conduit end inserted into the recess. A conduit inner diameter seal is positioned concentrically around an outer surface of the tubular member to prevent fluid passage between the tubular member and a conduit inner surface defining the conduit bore. A recess inner diameter seal is positioned concentrically around a peripheral region of the radially enlarged member to prevent fluid passage between the radially enlarged member and an inner surface of the conduit body defining the recess. Also, at least one back-up seal is positioned in the recess to sealingly engage the outer surface of a conduit inserted into the recess with the conduit body inner surface defining the recess. A retaining collet is concentrically positioned in the recess and includes a tapered outer surface. A back-up member is also positioned in the recess and includes a tapered bearing surface generally complimentary with the collet tapered outer surface. In this manner, relative axial movement of the collet and the back-up member upon attempted withdrawal of a conduit from the recess causes the collet tapered surface to bear against the back-up ring tapered bearing surface to radially constrict the collet into engagement with the outer conduit surface.

In accordance with another aspect of the invention, a double-ended stab-type coupling for joining two conduits in fluid communication includes a non-metallic coupling body including first and second conduit receiving recesses formed respectively in first and second portions to define first and second coupling halves. Each of the first and second recesses is at least partially defined by a tapered inner surface and each coupling half respectively includes a stiffener assembly positioned in the recess. The stiffener assembly includes a tubular member for insertion into a bore of a conduit inserted into the recess and a radially enlarged member connected to the tubular member and located in an axially inner region of the recess. The stiffener assembly also includes a conduit inner diameter seal positioned concentrically around an outer surface of the tubular member to prevent fluid passage between the tubular member and a conduit inner surface defining a conduit bore, and a recess inner diameter seal positioned concentrically around a peripheral surface of the radially enlarged member to prevent fluid passage between the radially enlarged member and an inner surface of the conduit body defining the recess. The double-ended coupling also includes at least one back-up seal positioned in the recess to sealingly engage the outer surface of a conduit inserted into the recess with the conduit body inner surface defining the recess. A retaining collet is concentrically positioned in the recess and includes a tapered outer surface generally complimentary with the tapered recess surface, whereby axial movement of the collet upon attempted conduit withdrawal from the recess causes the collet tapered surface to bear against the recess tapered surface such that the collet is radially constricted into engagement with a conduit outer surface.

In accordance with a further aspect of the invention, a riser coupling assembly includes a coupling body having a first end including an internal recess for receiving an end portion of a smooth-walled conduit surrounded by a protective casing and a threaded second end for connection to a gas meter. A stiffener assembly is positioned in the recess and includes a tubular member for insertion into a bore of a conduit inserted into the recess, along with a radially enlarged member connected to the tubular member and located in an axially inner region of the recess. The radially enlarged member abuts a conduit end inserted into the recess. A conduit inner diameter seal is positioned concentrically around an outer surface of the tubular member to prevent fluid passage between the tubular member and a conduit inner surface defining a conduit bore. A recess inner diameter seal is positioned concentrically around a peripheral region of the radially enlarged member to prevent fluid passage between the radially enlarged member and an inner surface of the conduit body defining the recess. At least one back-up seal is positioned in the recess to sealingly engage the outer surface of a conduit inserted into the recess with the conduit body inner surface defining the recess, and a retaining collet is concentrically positioned in the recess. The collet including a tapered outer surface. A back-up member is also positioned in the recess and includes a tapered bearing surface generally complimentary with the collet tapered outer surface, whereby relative axial movement of the collet and the back-up member upon attempted withdrawal of a conduit from the recess causes the collet tapered surface to bear against the back-up ring tapered bearing surface such that the collet is radially constricted into engagement with a conduit outer surface.

In accordance with another aspect of the present invention, a stiffener assembly for connection to an end of a smooth-walled plastic conduit includes a tubular member for insertion into a bore of a conduit and a radially enlarged retaining and spacing member connected to an end of the tubular member. The retaining and spacing member includes an annular conduit end receiving channel formed therein for receiving a conduit end when the tubular member is inserted into a conduit bore. A conduit inner diameter seal sealingly engages the tubular member and a conduit inner surface defining the conduit bore. A recess inner diameter seal sealingly engages the radially enlarged retaining and spacing member and an inner surface defining a recess when the stiffener assembly is positioned in a recess.

In accordance with still another aspect of the invention, a stiffener assembly for connection to an end of a smooth walled plastic conduit includes a tubular portion for insertion into a bore of the conduit and a conduit inner diameter seal extending circumferentially around the tubular portion to sealingly engage the tubular portion with an inner wall of the conduit. A radially enlarged portion is connected to and extends radially outward from the tubular portion. An elastomeric seal is permanently bonded to at least a peripheral portion of the radially enlarged portion so that an annular conduit-end receiving groove is defined radially between the seal and the tubular portion.

One advantage of the present invention is that it securely grips and retains a conduit inserted therein.

Another advantage of the present invention is that it effectively seals the inner diameter of the coupling body, as well as the inner diameter of the coupled conduit.

Still another advantage of the present invention is that it includes a redundant seal arrangement for both the coupling inner diameter seal and the conduit inner diameter seal.

Yet another advantage of the present invention is that it provides a simplified construction.

Still other benefits and advantages of the present invention will become apparent to those of ordinary skill in the art upon reading and understanding the following detailed description of the preferred embodiments

BRIEF DESCRIPTION OF THE DRAWINGS

The invention may take form in certain parts and arrangements of parts. The drawings are only for purposes of illustrating preferred embodiments, and are not to be construed as limiting the invention.

DETAILED DESCRIPTION OF THE PREFERRED EMBODIMENTS

Figure 1:
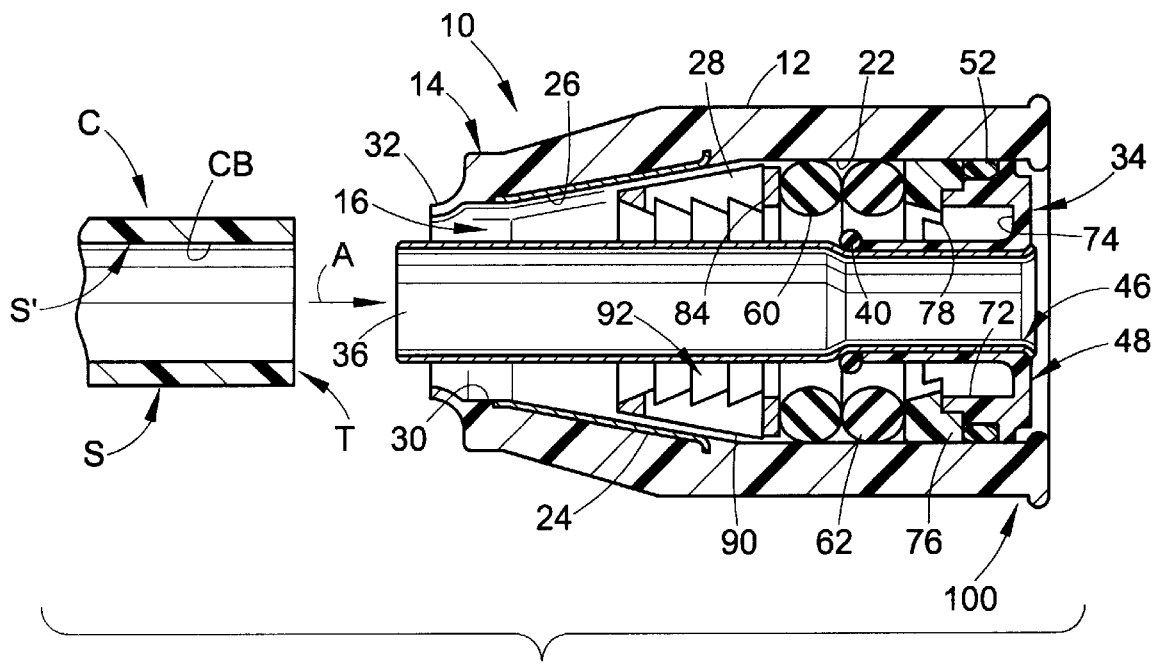
FIG. 1 is a cross-sectional view of a stab-type coupling in accordance with the present invention, also including a cross-sectional illustration of a conduit to be coupled therein.

Referring now to FIG. 1, a conduit coupling in accordance with the present invention is shown generally at 10. The coupling 10 includes a non-metallic coupling body 12 having a first end 14 and an internal conduit receiving recess 16 which receives a transverse end T of a conduit C, which may be a smooth-walled plastic gas transmission conduit or the like, in the manner indicated by the arrow A.

The coupling body 12 defines an inner, generally cylindrical surface 22. A generally frusto-conical back-up ring 24, preferably metallic, is molded or otherwise positioned in the coupling body 12 to define an inner, generally frusto-conical bearing surface 26 which converges toward the coupling first end 14. The surface 26, which is alternatively provided directly by an inner wall portion of the coupling body 12, cooperates with a retaining collet 28, as described in detail below, to securely retain the conduit C in the coupling body recess 16 once the conduit transverse end T is fully inserted therein.

Near the coupling first end 14, there is defined an inner, generally cylindrical surface 30 that closely surrounds the outer surface S of the conduit C. A flexible flange 32 is preferably molded integrally with the coupling body 12 to act as a dirt and moisture shield which inhibits the passage of dirt and moisture into the coupling recess 16. It should be appreciated that the relationship between the flange 32 and the conduit C is such that the flange 32 sealingly engages the conduit outer surface S with a slight interference fit.

In the preferred embodiment, the coupling body 12 is injection molded from a plastic such as polyethylene. The back-up ring 24 is preferably fabricated from a corrosion resistant metal such as stainless steel.

Figure 2:
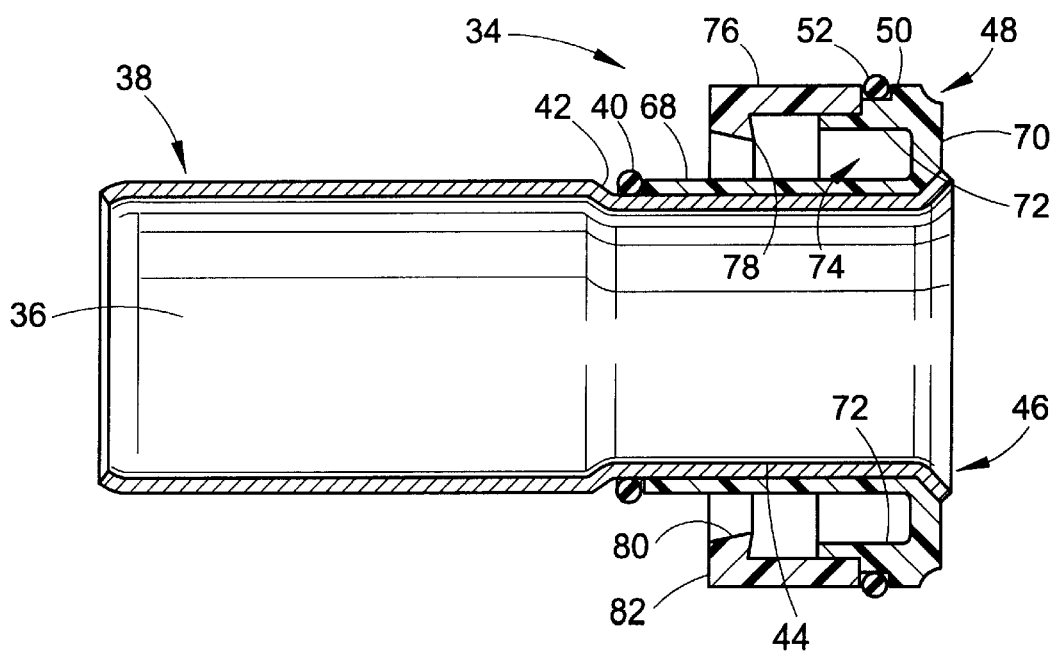
FIG. 2 is a cross-sectional view of a stiffener assembly in accordance with the invention.

Positioned in the recess 16, approximately concentric therewith, is a reinforcing stiffener assembly 34. With reference now also to FIG. 2, it can be seen that the stiffener assembly 34 includes an elongated tubular portion 36 for insertion into the conduit bore CB. The insertion of the tubular portion 36 into the conduit bore CB does not significantly adversely affect fluid passage through the conduit C and coupling 10, but provides increased rigidity to the conduit in the region of the transverse end T.

The external surface 38 of the tubular portion 36 is preferably received in the conduit bore CB in close sealing engagement therewith to inhibit the passage of fluid between the tubular portion 36 and the conduit inner surface S' defining the conduit bore CB. To further ensure that no fluid will pass between the inner surface S' the outer surface 38 of the stiffener assembly 34, an elastomeric O-ring seal 40 or the like is piloted on the outer surface 38 of the tubular portion 36 and lies against a shoulder 42 formed in the tubular surface 38 where it transitions to a radially reduced or constricted portion 44. The O-ring seal 40 is especially well-suited for blocking any passages created by scoring in the conduit inner surface S' defining the conduit bore CB. Of course, those skilled in the art will recognize that the O-ring seal 40 may alternatively be provided in a circumferential groove formed in the tubular outer surface 38.

Piloted on or formed as a one piece construction with the stiffener tubular portion 36 at an inner end 46 thereof is a radially enlarged retaining and spacing member or portion 48. As shown herein, the retaining and spacing member 48 is formed separately but is integrally connected to the tubular member 36. More particularly, the member 48 is piloted on the reduced diameter portion 44 of the tubular member 36. The retaining and spacing member 48 is located axially between the shoulder 42 and the inner end 46 of the tubular member 36 which is outwardly flared or includes other means for preventing axial movement of the spacing and retaining member, together with the shoulder 42.

As is seen most clearly in FIG. 1, the retaining and spacing member 48 has an outer diameter that is minimally smaller than the inner diameter of the recess 16 in the region of the cylindrical surface 22. Therefore, the surface 22 acts to center the stiffener assembly 34. Also, a circumferential groove 50 is formed in the outer peripheral surface or region of the member 48 and an elastomeric O-ring seal 52 is positioned therein to prevent fluid passage between the cylindrical surface 22 and the retaining and spacing member 48.

In the event that either O-ring seal 40,52 fails, at least one back-up or redundant seal is positioned in the recess 16 to prevent the escape of fluid from the coupling 10. Specifically, as shown herein, first and second elastomeric O-ring seals 60,62 or the like are positioned in the recess 16 along the inner cylindrical surface 22. The relationship of the O-ring seals 60,62 to the conduit C and the surface 22 is such that when the conduit C is inserted into the recess 16 as described, the seals 60,62 are slightly compressed between the conduit outer surface S and the cylindrical surface 22 of the coupling body 12. The seals 60,62 prevent the passage of fluid therepast in either axial direction between the conduit outer surface S and the coupling body 12.

The retaining and spacing member 48 is defined by or includes a hub portion 68 piloted on the tubular member 36, a radially outward extending portion 70 connected to the hub portion 68, and an axially extending portion 72 that is connected to the radially extending portion 70 and extends axially toward the coupling first end 14. As such, a receiving channel 74 is defined in the retaining and spacing member 48 for the transverse end T of the conduit C.

When the conduit C is fully and properly inserted in the coupling recess 16, the tubular portion 36 of the stiffener assembly 34 is received in the conduit bore CB and the transverse end T is seated in the channel 74, closely surrounded thereby. To ensure that, once fully inserted, the conduit transverse end T is not able to be pulled from the channel 74, the retaining and spacing member 48 also comprises an integral gripping ring 76. As shown herein, the gripping ring 76 is sonically welded or otherwise integrally connected to the axially extending portion 72 of the member 48. Alternatively, the gripping ring 76 is formed as a one-piece construction with the remainder of the retaining and spacing member or is connected thereto with an interference fit. The integral connection of the gripping ring 76 to the remainder of the retaining and spacing member 48 eliminates the need for a separate gripping ring or washer loosely positioned in the recess 16.

The gripping ring 76 includes at least one, and preferably a plurality of radially inward directed bite teeth 78 that engage the conduit outer surface S in an interference fit. Upon the subsequent attempted withdrawal of the conduit transverse end T from the channel 74 and recess 16, the teeth 78 cause the entire stiffener assembly 34 to move axially with the conduit C, which results in the conduit C being more firmly gripped by the collet 28 as is described below.

It can be seen that the axially extending portion 72 and the gripping ring 76 of the member 48 also act as a spacer element to shift the O-ring seals 60,62 and the retaining collet 28 axially outward, i.e., toward the coupling end 14, so that these components are operatively positioned for coupling and sealing operations as described herein. Therefore, there is no need for the coupling 10 to include a separate spacer element as is found in prior conduit couplings. Furthermore, to facilitate conduit insertion into the channel 74, the gripping ring 76 preferably includes a chamfered surface 80 that converges radially inward toward the channel 74. It should also be noted that, as an alternative to the illustrated position of the inner diameter O-ring seal 40, the seal 40 may be positioned about the hub portion 68 of the retaining and spacing element 48, preferably in an outer circumferential groove thereof.

The retaining and spacing member 48 includes an axially outward facing planar thrust surface 82 that engages the one or more O-ring seals 60,62. The formation of the retaining and spacing member 48, and particularly the gripping ring 76 thereof, with the thrust surface 82 eliminates the need to use a separate thrust washer axially between the retaining and spacing element 48 and the seals 60,62.

A thrust washer 84 is positioned axially between the one or more seals 60,62 and the retaining collet 28 to prevent movement of the seals 60,62 into the gripping portion of the collet 28 which would result in seal damage. Alternatively, a thrust surface is formed directly on the axially inner side of the collet 28. Thus, the seals 60,62 are captured between the thrust surface 82 and the washer 84 for effective sealing as described.

With particular reference again to FIG. 1, the retaining collet 28 includes a tapered outer surface 90 which converges in the direction of the coupling first end 14. The tapered surface 90 is generally complimentary to the frustoconical surface 26 of the body 12 as defined by the back-up ring 24. Axial outward movement of the collet 28 causes its outer tapered surface 90 to bear against the surface 26. This consequently causes radial constriction of the collet 28 about the conduit C. The collet 28 includes a toothed inner surface 92 for biting engagement on the conduit outer surface S when the collet 28 is radially constricted.

In operation, the conduit transverse end T is inserted in to the recess 16. The tubular portion 36 of the stiffener assembly 34 is received in the conduit bore CB and the conduit transverse end T is seated in the channel 74 of the retaining and spacing member 48. The seal 40 seals the conduit inner diameter, i.e., sealingly engages the inner surface S' of the conduit and the stiffener assembly 34. The seal 52 likewise seals the coupling body inner diameter, i.e., sealingly engages the inner surface 22 and the stiffener assembly 34. The backup seals 60,62 sealingly engage the coupling inner surface 22 with the conduit outer surface S to prevent the escape of fluid from the coupling, even of either or both seals 40,52 fail.

Attempted withdrawal of the conduit C from the recess 16 causes limited axial outward movement of the stiffener assembly 34, due to the engagement of the gripping ring 76 and the conduit C. The thrust surface 82 acts on the seals 60,62 which correspondingly act on the thrust washer 84 so that the seals 60,62 and the collet 28 move axially outward toward the coupling end 14. As described, this causes the collet tapered outer surface 90 to bear against the inner tapered surface 26 of the coupling body 12 so that the collet is radially constricted into biting engagement with the conduit outer surface S. Upon maximum radial construction of the collet 28, as limited by its construction and the outer diameter of the conduit C, further axial outward movement of the conduit is prevented.

In the preferred embodiment, the retaining collet 28 is molded from an acetal copolymer. Other materials such as brass, stainless steel, other plastics, and reinforced plastic may alternatively be used.

The invention has thus far been described with reference to a coupling body 12 having a first end 14. A second coupling end 100 may take alternative forms. For example, the second end 100 could be provided with male or female threads or any other suitable fitting structure. These fittings are easily welded or otherwise bonded or connected to the coupling body end 100.

Figure 4:
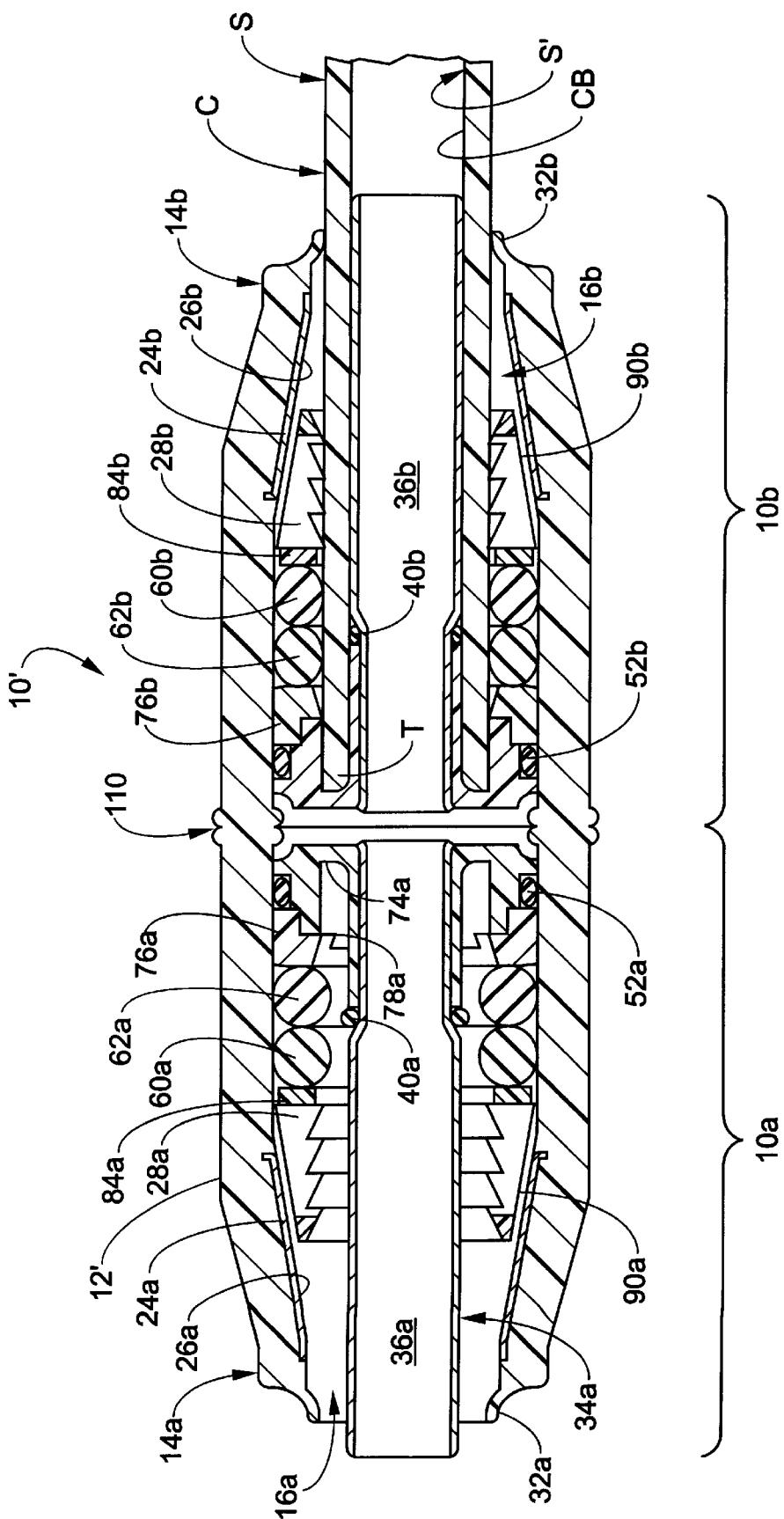
FIG. 4 is a cross-sectional view of another alternative embodiment of a stab-type coupling in accordance with the present invention; AND, FIG. 5 is a cross-sectional view of a further alternative embodiment of a stab-type coupling in accordance with the present invention.

FIG. 4 illustrates a double-ended modification 10' of the invention wherein a pair of couplings 10 are joined together at their second ends 100 by welding or adhesive bonding. The coupling 10' is useful for connecting first and second conduits in fluid communication and generally includes a butt heat fused joint 110 where the coupling ends 100 are joined to form a coupling body 12' having opposing ends 14a,14b. The ends 14a,14b respectively include conduit receiving recesses 16a,16b that join conduits C inserted respectively therein in fluid communication (only one conduit C is shown for clarity) In all other respects, the coupling 10' operates in the same manner as the coupling 10.

Figure 3:
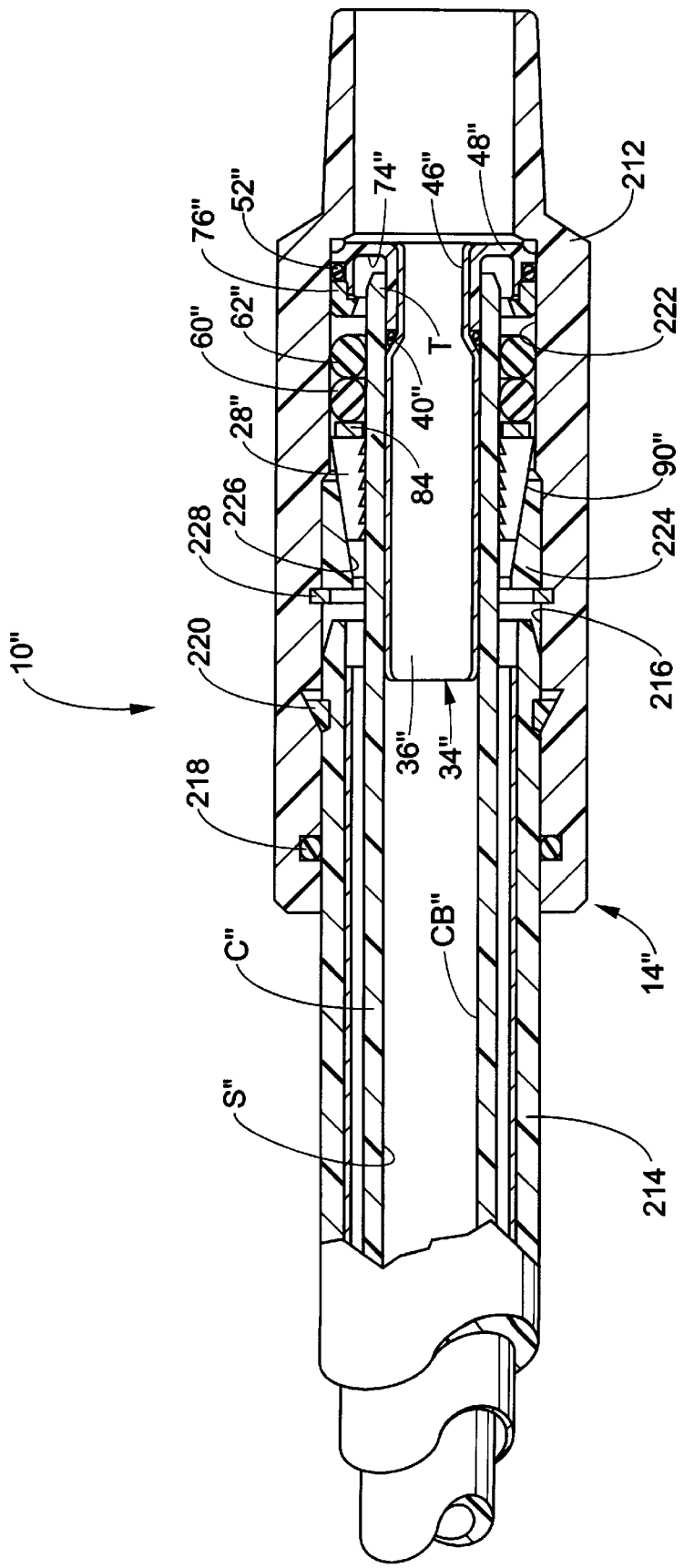
FIG. 3 is a cross-sectional view of an alternative embodiment of a stab-type coupling in accordance with the present invention.

Referring now to FIG. 3, another alternative coupling in accordance with the present invention is illustrated generally at 10". All like components relative to the coupling 10 are correspondingly numbered but also include a double-primed (") suffix. New components are identified with new reference numbers.

The coupling 10" is a "riser" coupling assembly used for interconnecting an underground natural gas service line or the like with a meter or other above-ground fixture located at a residence or business. The riser coupling 10" comprises a service head adapter housing 212, preferably metallic, for connecting the coupling 10" to a gas meter manifold or the like. The service head adapter defines an internal recess 216 which receives an outer conduit protective casing or sheath 214. A conduit C" extends axially beyond the casing 214 and fully into the recess 216. An O-ring seal 218 is positioned in an inner circumferential groove formed in the adapter housing 212 and seals any gap between the adapter housing 212 and the casing 214. A split-ring retainer 220 or the like engages opposing grooves or notches formed respectively in the adapter housing 212 and the casing 214 to prevent axial movement but allow rotation of the casing relative to the adapter housing 212.

A back-up sleeve member 224 corresponds to the back-up ring 24 of the coupling 10 and similarly defines a tapered surface 226 which converges outwardly toward the coupling end 14". The sleeve is restrained against axial outward movement in the recess using a suitable snap-ring 228 or the like. As described above in relation to the coupling 10, the tapered outer surface 90" of the collet 28" bears against the tapered surface 226 upon axial outward movement of the collet. This action causes radial constriction and biting engagement of the collet 28" about the conduit C".

The riser coupling 10" is similar in all other respects to the coupling 10. A stiffener assembly 34" includes an elongated tubular member 36" and a retaining and spacing member 48" connected to an inner end 46" thereof. The inner diameter seals 40" and 52" respectively seal the inner diameter or surface S" of the conduit C" and the inner diameter or surface 222 of the adapter body 212. Back-up seals 60",62" are provided to sealingly engage the adapter inner diameter surface 222 and the conduit outer surface to block any fluid that bypasses either seal 40",52". The seals 60",62" are captured between the retaining and spacing member 48" and a thrust washer 84" as described above.

Any attempted withdrawal of the conduit C" from the recess 216 results in axial outward movement of the stiffener assembly 34", and consequently, the collet 28". The collet outer surface 90" is then caused to bear against the surface 226 so that the collet 28" is radially constricted about the conduit C". Upon maximum radial constriction of the collet, further axial outward movement of the conduit is prevented.

Figure 5:
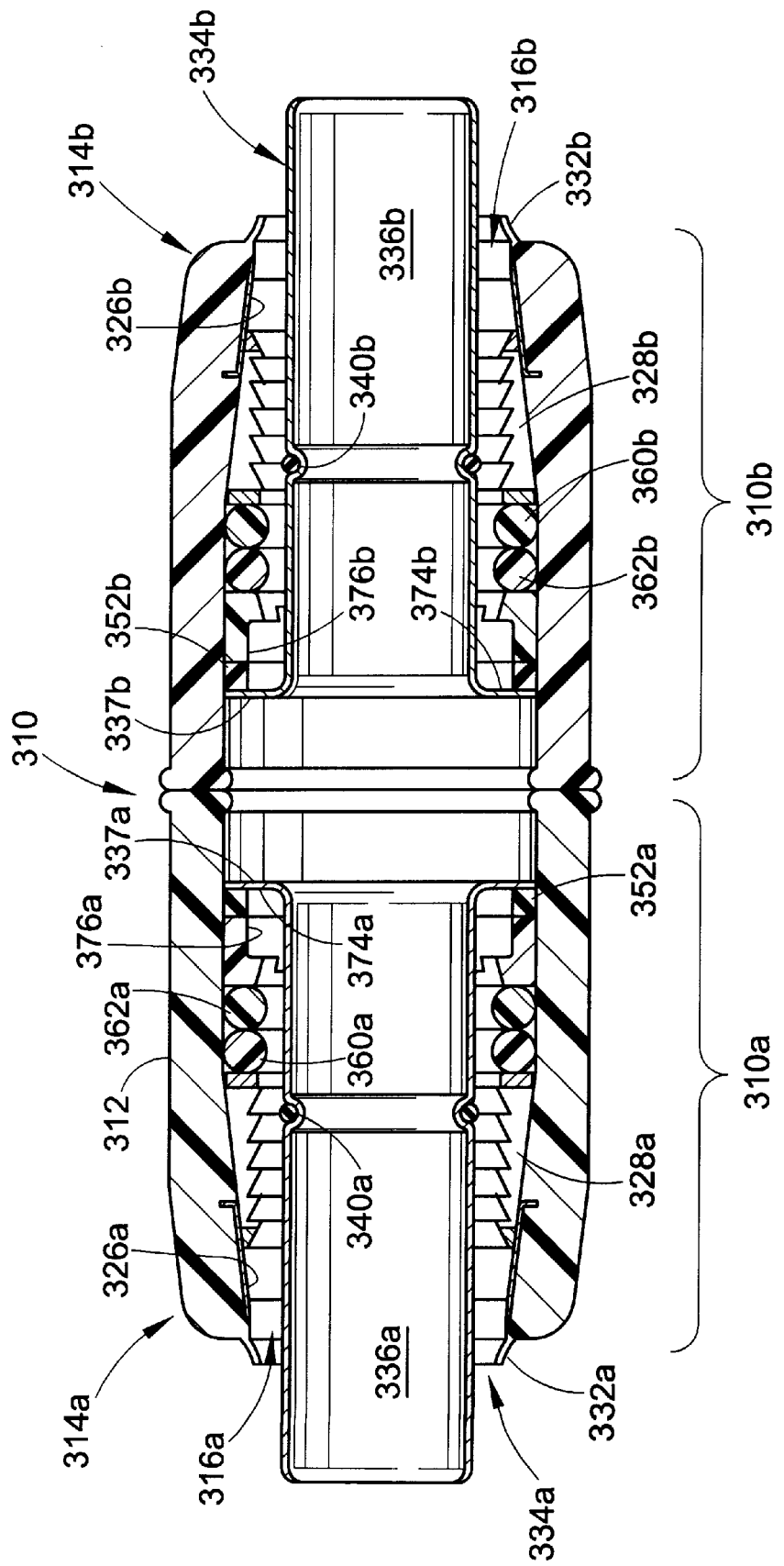

FIG. 5 illustrates another alternative double-ended coupling 310 comprising first and second single-ended coupling halves or portions 310a,310b, each of said portions being usable alone as a single-ended coupling when not interconnected as shown. Except as shown and as noted herein, the coupling 310 is similar in all respects to the coupling 10' and corresponding components relative to the coupling 10' are identified with like reference numbers that are 300 greater than those used to identify components of the coupling 10'. New components relative to the coupling 10' are identified with new reference numbers.

Each coupling portion 310a,310b respectively includes an alternative stiffener assembly 334a,334b each having a tubular portion 336a,336b and a radially enlarged portion or flange 337a,337b preferably formed as a one-piece construction. A recess inner diameter seal 352a,352b is associated with each stiffener assembly 334a,334b and is preferably permanently bonded or otherwise affixed to at least a peripheral region of the radially enlarged stiffener portion 337a, 337b through use of adhesive or other suitable means. Most preferably, the seal 352a,352b is molded directly to the radially enlarged portion 337a,337b, respectively, through an insert-molding process. An annular conduit-end receiving groove or channel 374a,374b is consequently defined between each seal 352a,352b and the associated tubular stiffener portion 336a,336b.

The subject stiffener assembly 334a,334b is a simplified construction and facilitates assembly of the coupling portions 310a,310b. Furthermore, use of the elastomeric seal 352a,352b to define the conduit-end receiving groove 374a, 374b, respectively, causes the conduit end to force the seal 352a,352b somewhat radially outwardly upon the conduit end being inserted in the groove 374a,374b. This, then, ensures a fluid-tight seal between the stiffener assembly 334a,334b and the coupling inner wall defining the recess 316a,316b.

As with the coupling 10', a gripping ring 376a,376b is positioned in each coupling recess 316a,316b. The gripping ring 376a is preferably positioned axially between the seals 352a,362a and the gripping ring 376b is correspondingly positioned axially between the seals 352b,362b. Accordingly, the gripping rings 376a,376b act to retain an inserted conduit end in the annular conduit-end receiving channel 374a,374b, respectively.

The conduit inner diameter seal 340a,340b provided as a part of each stiffener assembly 334a,334b is preferably situated in a circumferentially extending groove (not numbered) formed in the outer surface of the stiffener tubular portion 336a,336b, respectively.

The invention has been described with reference to the preferred embodiments. Obviously, modifications and alterations will occur to others upon reading and understanding the preceding detailed description. It is intended that the invention be construed as including all such modifications and alterations insofar as they come within the scope of the appended claims or the equivalents thereof.

Having thus described the preferred embodiments, the invention is now claimed to be:

1. A stab-type coupling for connecting a smooth-walled conduit to a fitting or another conduit, said coupling comprising:
   a coupling body having a first end and an internal recess for receiving an end portion of a smooth-walled conduit;
   a stiffener assembly positioned in said recess, said stiffener assembly including:
      a tubular portion for insertion into a bore of a conduit inserted into said recess,
      a radially enlarged portion located in an axially inner region of said recess, said radially enlarged portion abutting a conduit end inserted into said recess,
      a conduit inner diameter seal positioned concentrically around an outer surface of the tubular portion to prevent fluid passage between said tubular portion and a conduit inner surface defining a conduit bore, and,
      a recess inner diameter seal positioned concentrically around a peripheral region of said radially enlarged portion to prevent fluid passage between said radially enlarged portion and an inner surface of said body defining said recess;
   at least one back-up seal positioned in said recess to sealingly engage the outer surface of a conduit inserted into said recess with said body inner surface defining said recess;
   a retaining collet concentrically positioned in said recess, said collet including a tapered outer surface; and,
   a tapered bearing surface defined in said recess generally complementary with said collet tapered outer surface, whereby axial movement of said collet upon attempted withdrawal of a conduit from said recess causes said collet tapered surface to bear against said tapered bearing surface such that said collet is radially constricted into engagement with a conduit outer surface.

2. The stab-type coupling as set forth in claim 1 wherein said radially enlarged portion of said stiffener assembly comprises a retaining and spacing member defining an annular conduit end receiving channel for receiving a conduit end inserted into said recess.

3. The stab-type coupling as set forth in claim 2 wherein said conduit end receiving channel of said radially enlarged retaining and spacing member is defined by:
   a first portion extending radially outward from an inner end region of said tubular member; and,
   a second portion extending axially from said first radial portion toward said coupling first end, said second portion spacing said retaining collet toward said coupling body first end.

4. The stab-type coupling as set forth in claim 3 wherein said retaining and spacing member of said stiffener assembly further comprises an integral gripping ring including at least one inwardly directed bite tooth, said gripping ring being concentric relative to said tubular member such that said at least one bite tooth engages an outer surface of a conduit inserted into said conduit end receiving channel.

5. The stab-type coupling as set forth in claim 4 wherein said gripping ring includes a planar thrust surface facing toward said coupling body first end.

6. The stab-type coupling as set forth in claim 1 wherein said radially enlarged portion of said stiffener assembly is formed as a one-piece construction with said tubular portion of said stiffener assembly, said recess inner diameter seal affixed to the peripheral region of said radially enlarged stiffener portion so that an annular conduit-end receiving channel is defined at least partially by said recess inner diameter seal.

7. The stab-type coupling as set forth in claim 1 wherein said coupling body is made from polyethylene.

8. The stab-type coupling as set forth in claim 1 wherein said coupling body is metallic and includes a threaded second end for fluidically connecting said coupling body to a fluid receiving article.

9. A stab-type coupling for connecting a smooth-walled conduit to a fitting or another conduit, said coupling comprising:
   a coupling body having a first end and an internal recess for receiving an end portion of a smooth-walled conduit;
   a stiffener assembly positioned in said recess, said stiffener assembly including:
      a tubular portion including an outer end adapted for insertion into a bore of a conduit inserted into said recess,
      a radially enlarged portion located in an axially inner region of said recess at an inner end of said tubular portion, said radially enlarged portion comprising a retaining and spacing member defining an annular conduit end receiving channel for receiving a conduit end inserted into said recess and further defining a hub portion piloted on an outer surface of said tubular member at said inner end of said tubular member,
      a conduit inner diameter seal positioned concentrically around an outer surface of the tubular portion to prevent fluid passage between said tubular portion and a conduit inner surface defining a conduit bore, and,
      a recess inner diameter seal positioned concentrically around a peripheral region of said radially enlarged portion to prevent fluid passage between said radially enlarged portion and an inner surface of said body defining said recess;

at least one back-up seal positioned in said recess to sealingly engage the outer surface of a conduit inserted into said recess with said body inner surface defining said recess;

a retaining collet concentrically positioned in said recess, said collet including a tapered outer surface; and, a tapered bearing surface defined in said recess generally complementary with said collet tapered outer surface, whereby axial movement of said collet upon attempted withdrawal of a conduit from said recess causes said collet tapered surface to bear against said tapered bearing surface such that said collet is radially constricted into engagement with a conduit outer surface.

10. The stab-type coupling as set forth in claim 9 wherein said tubular member inner end is outwardly flared to prevent the disengagement of said retaining and spacing member from said tubular member.

11. The stab-type coupling as set forth in claim 10 wherein said tubular member includes a radially reduced portion and wherein said retaining and spacing member is piloted on said radially reduced portion and restrained from axial movement between said flared inner end of said tubular member and a shoulder of said tubular member providing a transition between said radially reduced portion and said outer end of said tubular member.

12. A double-ended stab-type coupling for joining two conduits in fluid communication, said coupling comprising:

a coupling body including first and second conduit receiving recesses formed respectively in first and second portions of said coupling body to define first and second coupling halves, each of said first and second recesses being at least partially defined by a tapered inner surface and each coupling half respectively comprising:

a stiffener assembly positioned in said recess, said stiffener assembly including:

a tubular portion for insertion into a bore of a conduit inserted into said recess, a radially enlarged portion connected to said tubular portion and located in an axially inner region of said recess, said radially enlarged portion abutting a conduit end inserted into said recess, a conduit inner diameter seal positioned concentrically around an outer surface of the tubular portion to prevent fluid passage between said tubular portion and a conduit inner surface defining a conduit bore, and, a recess inner diameter seal positioned concentrically around a peripheral region of said radially enlarged portion to prevent fluid passage between said radially enlarged portion and an inner surface of said body defining said recess;

at least one redundant seal positioned in said recess to sealingly engage the outer surface of a conduit inserted into said recess with said body inner surface defining said recess;

a retaining collet concentrically positioned in said recess, said collet including a tapered outer surface generally complementary with said tapered recess surface, whereby axial movement of said collet upon attempted conduit withdrawal from said recess causes said collet tapered surface to bear against said recess tapered surface such that said collet is radially constricted into engagement with a conduit outer surface.

13. The stab-type coupling as set forth in claim 12 wherein said radially enlarged portion of said stiffener assembly of each coupling half comprises a retaining and spacing member defining an annular conduit end receiving channel for receiving a conduit end inserted into said recess.

14. The stab-type coupling as set forth in claim 13 wherein said conduit end receiving channel of said radially enlarged retaining and spacing member is defined by:

a first portion extending radially outward from an inner end region of said tubular member; and, a second portion extending axially outward from said first radial portion, said second portion spacing said retaining collet away from said inner end region of said tubular member.

15. The stab-type coupling as set forth in claim 14 wherein said retaining and spacing member of said stiffener assembly further comprises an integral gripping ring including at least one inwardly directed bite tooth, said gripping ring being concentric relative to said tubular member such that said at least one bite tooth engages an outer surface of a conduit inserted into said conduit end receiving channel.

16. The stab-type coupling as set forth in claim 15 wherein said gripping ring includes an outwardly facing planar thrust surface.

17. The stab-type coupling as set forth in claim 12 wherein said radially enlarged portion of said stiffener assembly of each coupling half is formed as a one-piece construction with said tubular portion of said stiffener assembly, said recess inner diameter seal affixed to the peripheral region of said radially enlarged stiffener portion so that an annular conduit-end receiving channel is defined at least partially by said recess inner diameter seal.

18. The stab-type coupling as set forth in claim 12 wherein said coupling body is made from polyethylene.

19. The stab-type coupling as set forth in claim 12 wherein said retaining collet includes an inner toothed surface.

20. A double-ended stab-type coupling for joining two conduits in fluid communication, said coupling comprising:

a coupling body including first and second conduit receiving recesses formed respectively in first and second portions of said coupling body to define first and second coupling halves, each of said first and second recesses being at least partially defined by a tapered inner surface and each coupling half respectively comprising:

a stiffener assembly positioned in said recess, said stiffener assembly including:

a tubular portion for insertion into a bore of a conduit inserted into said recess, a radially enlarged portion located in an axially inner region of said recess at an inner end of said tubular portion, said radially enlarged portion comprising a retaining and spacing member defining an annular conduit end receiving channel for receiving a conduit end inserted into said recess and further defining a hub portion piloted on an outer surface of said tubular member at said inner end of said tubular member, a conduit inner diameter seal positioned concentrically around an outer surface of the tubular portion to prevent fluid passage between said tubular portion and a conduit inner surface defining a conduit bore, and, a recess inner diameter seal positioned concentrically around a peripheral region of said radially enlarged portion to prevent fluid passage between said radially enlarged portion and an inner surface of said body defining said recess;

at least one redundant seal positioned in said recess to sealingly engage the outer surface of a conduit inserted into said recess with said body inner surface defining said recess;

a retaining collet concentrically positioned in said recess, said collet including a tapered outer surface generally complementary with said tapered recess surface, whereby axial movement of said collet upon attempted conduit withdrawal from said recess causes said collet tapered surface to bear against said recess tapered surface such that said collet is radially constricted into encarement with a conduit outer surface.

21. The stab-type coupling as set forth in claim 20 wherein said tubular member inner end is outwardly flared to prevent the disengagement of said retaining and spacing member from said tubular member.

22. The stab-type coupling as set forth in claim 20 wherein said tubular member includes a radially reduced portion and wherein said retaining and spacing member is piloted on said radially reduced portion and restrained from axial movement between said flared inner end of said tubular member and a shoulder of said tubular member providing a transition between said radially reduced portion and an axially outer portion of said tubular member.

23. A riser coupling assembly comprising:

a coupling body having a first end including an internal recess for receiving an end portion of a smooth-walled conduit surrounded by a protective casing and a threaded second end for connection to a gas meter;

a stiffener assembly positioned in said recess, said stiffener assembly including:

a tubular portion for insertion into a bore of a conduit inserted into said recess, a radially enlarged portion connected to said tubular portion and located in an axially inner region of said recess, said radially enlarged portion adapted for abutting a conduit end inserted into said recess, a conduit inner diameter seal positioned concentrically around an outer surface of the tubular portion to prevent fluid passage between said tubular portion and a conduit inner surface defining a conduit bore, and, a first recess inner diameter seal positioned concentrically around a peripheral region of said radially enlarged portion to prevent fluid passage between said radially enlarged portion and an inner surface of said body defining said recess;

a second recess inner diameter seal positioned in said recess to sealingly engage the outer surface of a conduit inserted into said recess with said body inner surface defining said recess;

a retaining collet concentrically positioned in said recess, said collet including a tapered outer surface; and, a back-up member positioned in said recess and including a tapered bearing surface generally complementary with said collet tapered outer surface, whereby relative axial movement of said collet and said back-up member upon attempted withdrawal of a conduit from said recess causes said collet tapered surface to bear against said back-up ring tapered bearing surface such that said collet is radially constricted into engagement with a conduit outer surface.

24. A stiffener assembly adapted for connection to an end of a smooth-walled plastic conduit, said stiffener assembly comprising:

a tubular member adapted for insertion into a bore of a conduit;

a radially enlarged retaining and spacing member integrally connected to an end of said tubular member, said retaining and spacing member including an annular conduit end receiving channel formed therein for receiving a conduit end when said tubular member is inserted into a conduit bore;

a conduit inner diameter seal sealingly engaging said tubular member and a conduit inner surface defining a conduit bore;

a recess inner diameter seal for sealingly engaging said radially enlarged retaining and spacing member and a surface defining a recess into which said stiffener assembly is inserted; and, a gripping ring integrally connected to said retaining and spacing member for frictionally engaging an outer surface of an associated conduit when an end of the associated conduit is seated in said conduit receiving channel, whereby axial movement of said gripping ring with the associated conduit causes axial movement of said radially enlarged retaining and spacing member integrally connected to said gripping ring.

\* \* \* \* \*